(12) United States Patent
Hamamoto et al.

(10) Patent No.: US 10,289,869 B2
(45) Date of Patent: May 14, 2019

(54) PERSONAL INFORMATION ANONYMIZATION METHOD, RECORDING MEDIUM, AND INFORMATION PROCESSING APPARATUS

(71) Applicant: FUJITSU LIMITED, Kawasaki-shi, Kanagawa (JP)

(72) Inventors: Masahiro Hamamoto, Osaka (JP); Shinji Matsune, Aki (JP); Takao Yoshida, Kurashiki (JP)

(73) Assignee: FUJITSU LIMITED, Kawasaki (JP)

( * ) Notice: Subject to any disclaimer, the term of this patent is extended or adjusted under 35 U.S.C. 154(b) by 274 days.

(21) Appl. No.: 15/214,819

(22) Filed: Jul. 20, 2016

(65) Prior Publication Data

US 2017/0061156 A1    Mar. 2, 2017

(30) Foreign Application Priority Data

Aug. 31, 2015  (JP) .................................. 2015-171057

(51) Int. Cl.
  *G06F 21/62* (2013.01)
  *H04L 29/06* (2006.01)

(52) U.S. Cl.
  CPC ...... *G06F 21/6254* (2013.01); *H04L 63/0421* (2013.01); *H04L 63/0407* (2013.01)

(58) Field of Classification Search
  CPC .................................................... H04L 63/421
  USPC .......................................................... 726/26
  See application file for complete search history.

(56) References Cited

U.S. PATENT DOCUMENTS

| | | |
|---|---|---|
| 2014/0189858 A1 | 7/2014 | Chen et al. |
| 2015/0339488 A1 | 11/2015 | Takahashi |
| 2016/0117526 A1 | 4/2016 | Takahashi |

FOREIGN PATENT DOCUMENTS

| | | | | |
|---|---|---|---|---|
| JP | 2014-71618 A | 4/2014 | | |
| JP | 2014-86037 A | 5/2014 | | |
| WO | WO-2014006851 A1 * | 1/2014 | ......... | G06F 21/6254 |
| WO | 2014/109277 A1 | 7/2014 | | |
| WO | 2014/181541 A1 | 11/2014 | | |

OTHER PUBLICATIONS

Machine translation of Toyoda reference (Year: 2014).*
Extended European Search Report dated Oct. 26, 2016, issued in counterpart European Patent Application No. 16180105.5. (7 pages).

* cited by examiner

*Primary Examiner* — Jacob Lipman
(74) *Attorney, Agent, or Firm* — Westerman, Hattori, Daniels & Adrian, LLP

(57) ABSTRACT

A personal information anonymization method is disclosed. Each of a plurality of data including personal information is classified into any one of a plurality of groups based on a degree of commonality of the personal information. An anonymization process, that standardizes the personal information of each of data belonging to each of the groups, is performed for each of the groups. A total number of the data belonging to each of the groups is calculated for each of the groups. The plurality of the groups are classified based on the total number of the sets of the data. A classification result is output.

12 Claims, 12 Drawing Sheets

FIG.6

1a NON-ANONYMIZED FILE

| NAME | ADDRESS | GENDER | AGE | DIAGNOSTIC RESULT |
|---|---|---|---|---|
| AAA BBB | Heiwajima 2, Ota-ku, Tokyo | M | 75 | DIABETES |
| CCC DDD | Yamashita 2, Ota-ku, Tokyo | M | 62 | HYPERTENSION |
| EEE FFF | Shibuya-ku, Tokyo | F | 18 | PNEUMONIA |
| GGG HHH | Ohmori-higashi 2, Ota-ku, Tokyo | F | 16 | ASTHMA |
| III JJJ | Nakahara-ku, Kawasaki-shi, Kanagawa-ken | M | 63 | INFLUENZA |

1m MASKED FILE

| ADDRESS | GENDER | AGE | DIAGNOSTIC RESULT |
|---|---|---|---|
| Tokyo | M | – | DIABETES |
| Tokyo | M | – | HYPERTENSION |
| Tokyo | F | – | PNEUMONIA |
| Tokyo | F | – | ASTHMA |

1b ANONYMIZED FILE

| ADDRESS | GENDER | AGE | DIAGNOSTIC RESULT |
|---|---|---|---|
| Ota-ku, Tokyo | M | 60s to 70s | DIABETES |
| Ota-ku, Tokyo | M | 60s to 70s | HYPERTENSION |
| Tokyo | F | 10s to 20s | PNEUMONIA |
| Tokyo | F | 10s to 20s | ASTHMA |

FIG.7

1b ANONYMIZED FILE

| ADDRESS | GENDER | AGE | DIAGNOSTIC RESULT |
|---|---|---|---|
| Ota-ku, Tokyo | M | 60s to 70s | DIABETES |
| Ota-ku, Tokyo | M | 60s to 70s | HYPERTENSION |
| Shibuya-ku, Tokyo | F | 10s to 20s | PNEUMONIA |
| Tokyo | F | 10s to 20s | ASTHMA |
| Shinagawa-ku, Tokyo | F | 10s to 20s | HEART DISEASE |
| Nakahara-ku, Kawasaki-shi, Kanagawa-ken | M | 60s to 70s | INFLUENZA |

53a EVALUATION TARGET INFORMATION

| ADDRESS | GENDER | AGE | DIAGNOSTIC RESULT | GROUP ID |
|---|---|---|---|---|
| Ota-ku, Tokyo | M | 60s to 70s | DIABETES | G001 |
| Ota-ku, Tokyo | M | 60s to 70s | HYPERTENSION | G001 |
| Tokyo | F | 10s to 20s | PNEUMONIA | G002 |
| Tokyo | F | 10s to 20s | ASTHMA | G002 |
| Tokyo | F | 10s to 20s | HEART DISEASE | G002 |
| Nakahara-ku, Kawasaki-shi, Kanagawa-ken | M | 60s to 70s | INFLUENZA | G003 |

59 STATISTICS INFORMATION

| GROUP ID | k VALUE | RATIO |
|---|---|---|
| G001 | 2 | 33% |
| G002 | 3 | 50% |
| G003 | 1 | 17% |

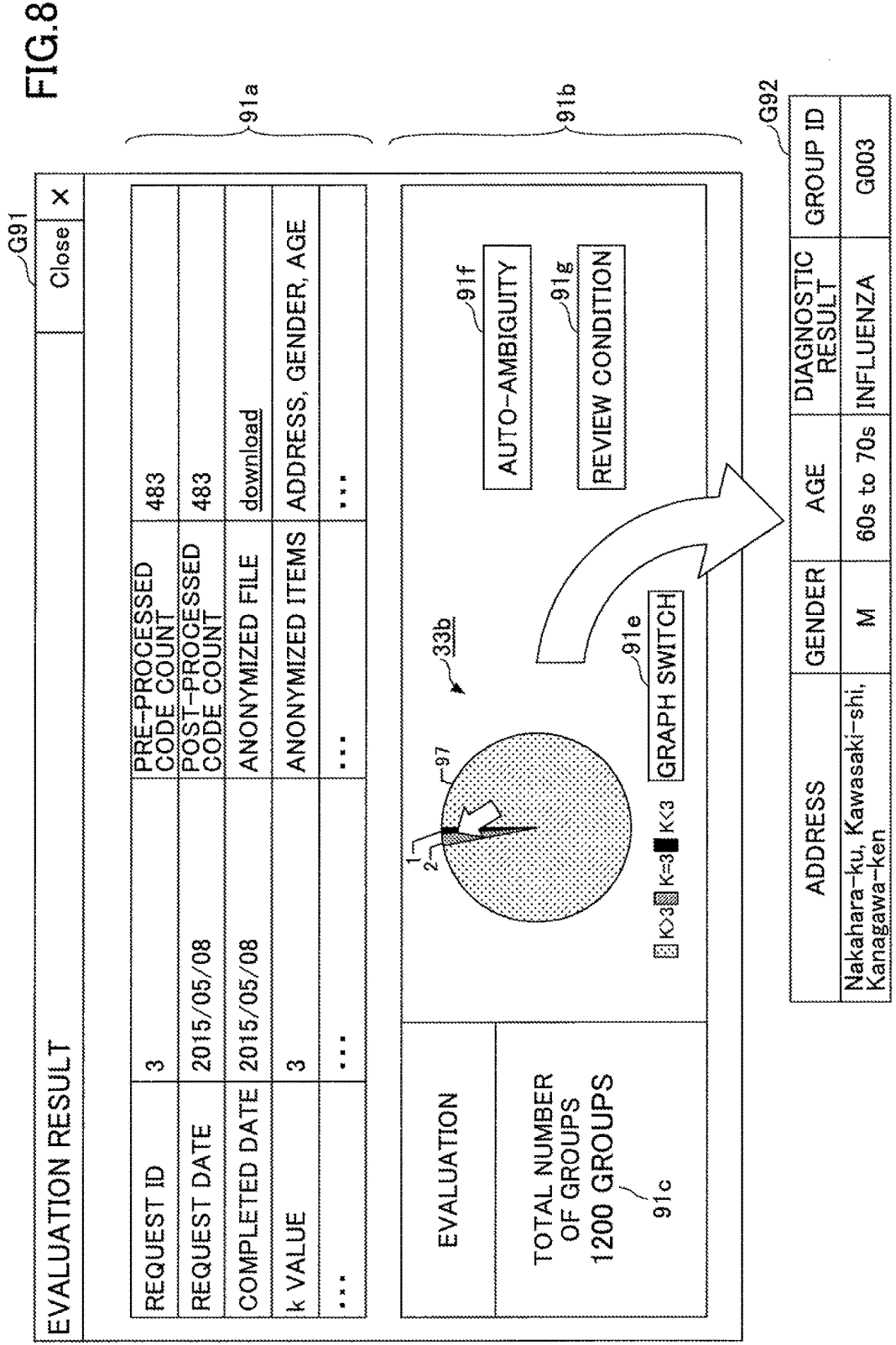

FIG.9

53a EVALUATION TARGET INFORMATION

| ADDRESS | GENDER | AGE | DIAGNOSTIC RESULT | GROUP ID |
|---|---|---|---|---|
| Ota-ku, Tokyo | M | 60s to 70s | DIABETES | G001 |
| Ota-ku, Tokyo | M | 60s to 70s | HYPERTENSION | G001 |
| Tokyo | F | 10s to 20s | PNEUMONIA | G002 |
| Tokyo | F | 10s to 20s | ASTHMA | G002 |
| Tokyo | F | 10s to 20s | HEART DISEASE | G002 |
| Nakahara-ku, Kawasaki-shi, Kanagawa-ken | M | 60s to 70s | INFLUENZA | G003 |

59 STATISTICS INFORMATION

| GROUP ID | k VALUE | RATIO |
|---|---|---|
| G001 | 2 | 33% |
| G002 | 3 | 50% |
| G003 | 1 | 17% |

53c SECOND EVALUATED INFORMATION

| ADDRESS | GENDER | AGE | GROUP ID | k VALUE | RATIO |
|---|---|---|---|---|---|
| Ota-ku, Tokyo | M | 60s to 70s | G001 | 2 | 33% |
| Tokyo | F | 10s to 20s | G002 | 3 | 50% |
| Nakahara-ku, Kawasaki-shi, Kanagawa-ken | M | 60s to 70s | G003 | 1 | 17% |

FIG.10

33c BAR GRAPH

| ADDRESS | GENDER | AGE | GROUP ID | k VALUE | RATIO |
|---|---|---|---|---|---|
| Nakahara-ku, Kawasaki-shi, Kanagawa-ken | M | 60s to 70s | G003 | 1 | 17% |
| Tokyo | F | 10s to 20s | G002 | 3 | 50% |
| Ota-ku, Tokyo | M | 60s to 70s | G001 | 2 | 30% |

59 STATISTICS INFORMATION

| GROUP ID | k VALUE | RATIO |
|---|---|---|
| G001 | 2 | 33% |
| G002 | 3 | 50% |
| G003 | 1 | 17% |

59-2 STATISTICS INFORMATION

| GROUP ID | k VALUE | RATIO |
|---|---|---|
| G001 | 2 | 29% |
| G002 | 3 | 43% |
| G003 | 2 | 29% |

PERSONAL INFORMATION ANONYMIZATION METHOD, RECORDING MEDIUM, AND INFORMATION PROCESSING APPARATUS

CROSS-REFERENCE TO RELATED APPLICATIONS

This application is based upon and claims the benefit of priority of the prior Japanese Patent Application No. 2015-171057, filed on Aug. 31, 2015, the entire contents of which are incorporated herein by reference.

FIELD

The embodiments discussed herein are related to a personal information anonymization method, a computer-readable recording medium, and an information processing apparatus.

BACKGROUND

Recently, due to wide use of cloud computing and diversification of businesses and communication devices such as smart phones, information accumulated by an on-premise system (by a computer system within an enterprise) has been accumulated and utilized by an external system, which does not belong to the enterprise or its organization.

The information may include customers' information and personal information. On the other hand, in a business operation, an operation in the cloud computing, or the like, in a case of a purpose of using information, by laws and guidelines, including the Act on the Protection of Personal Information (so-called "Personal Information Protection Act"), there is obligation to properly process the information so as not to identify a certain person.

Also, regarding the Law about the protection of the personal information and the Law to revise a part of the law about, the number use to distinguish the authorized individual in the administrative procedure (the 189th 2015 Diet under discussion) in Japan, the following contents have been under discussion. If the information is processed, to be in a state in which the person is not easily specified, that is, is anonymized, with an aim to further utilize information by an Information and Communication Technology, the information may be provided to a third party without permission of the person.

In a view of anonymizing and using data, a technology and the like have been known to receive various kinds of k-anonymized data from multiple data providing agents and to evaluate whether the received k-anonymized data are acceptable.

Patent Documents

Japanese Laid-open Patent Publication No. 2014-71618
Japanese Laid-open Patent Publication No. 2014-86037

SUMMARY

According to one aspect of the embodiment, there is provided a personal information anonymization method, including classifying each of a plurality of data including personal information into any one of a plurality of groups based on a degree of commonality of the personal information; performing, for each of the groups, an anonymization process that standardizes the personal information of each of data belonging to each of the groups; calculating, for each of the groups, a total number of the data belonging to each of the groups; classifying the groups based on the total number; and outputting a classification result.

The object and advantages of the invention will be realized and attained by means of the elements and combinations particularly pointed, out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an anonymization process;

FIG. 7 is a diagram for explaining an evaluation target information generation process;

FIG. 8 is a diagram illustrating an example of an evaluation result screen displayed at the client terminal;

FIG. 9 is a diagram for explaining a second graph process;

FIG. 10 is a diagram illustrating an example of a bar graph;

DESCRIPTION OF EMBODIMENTS

Regarding a related technology, there is a view that protection from specifying individuals is not assured by anonymized data. In a current state, the anonymized data are approved by being visually observed by a well-informed person or by being verified by a third party committee set up in the organization.

At a final stage, the well-informed person evaluates the anonymized data. An objective evaluation is difficult. In addition, in a case in which a huge amount of data such as Big Data or the like is subject to use, a large amount of time is consumed with expertise to confirm whether the data are anonymized as desired.

At the final stage of an anonymity evaluation by the well-informed person, it is not easy to comprehend to what degree the data are anonymized or to comprehend information pertinent to non-anonymized data.

In an embodiment describe below, the anonymized data are easily evaluated.

Figure 1:
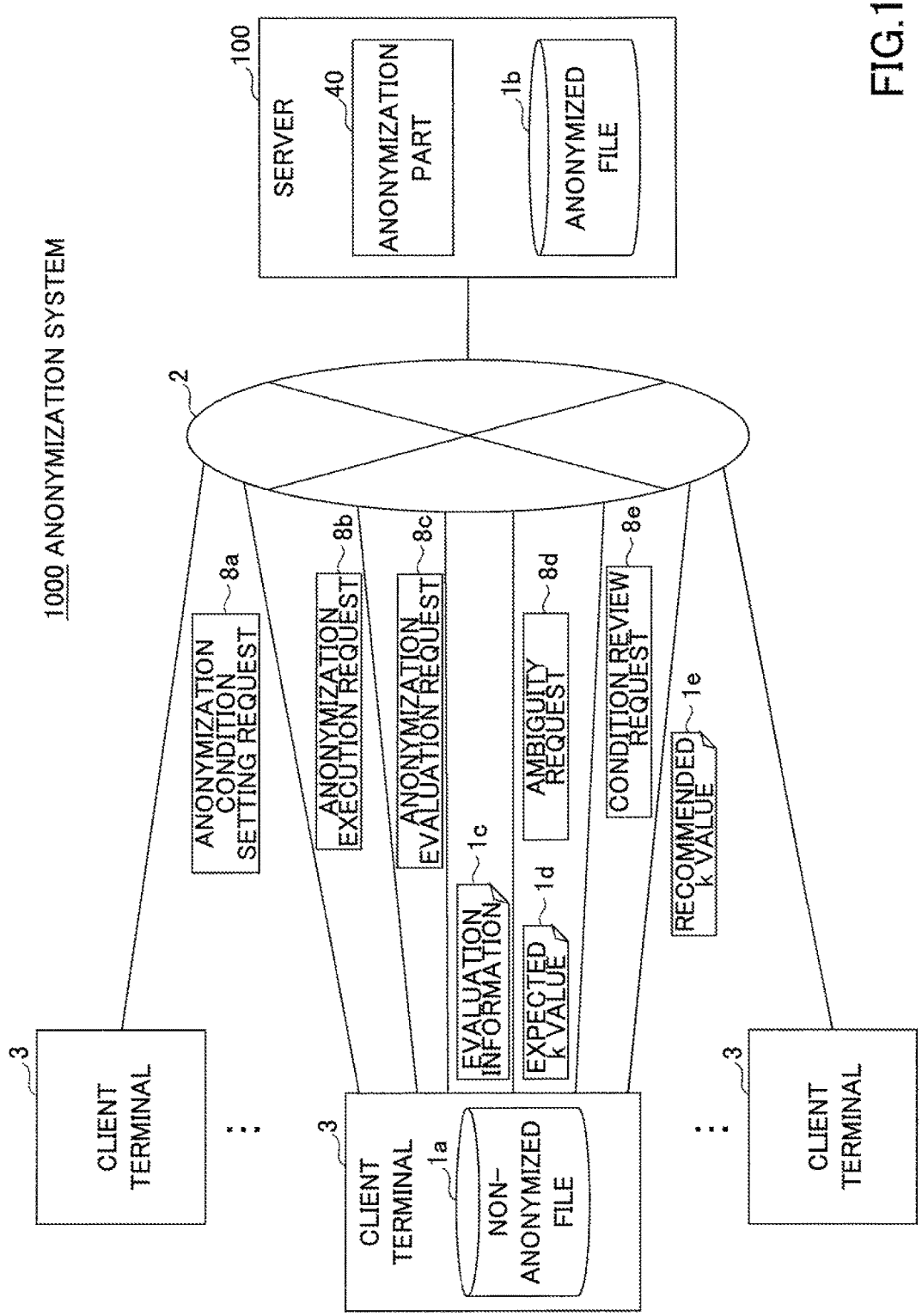
FIG. 1 is a diagram illustrating a network configuration of an anonymization system in an embodiment.

Preferred embodiments of the present invention will be described with reference to the accompanying drawings. An anonymization system in an embodiment will be described, in which personal information is anonymized and evaluated. FIG. 1 is a diagram illustrating a network configuration of the anonymization system in the embodiment. In an anonymization system 1000, a server 100, and multiple client terminals 3 are connected via a network 2. The personal information corresponds to information related to a specific individual. In the embodiment, an anonymization process includes at least one of a process for preventing from specifying the individual and a process for preventing from differentiating individuals.

The server 100 includes an anonymization part 40 that anonymizes data (which may be the personal information) provided from each of the client terminals 3, and performs the anonymization process to report an anonymization degree to each of the client terminals 3.

The client terminal 3 uses a service, which is provided by the server 100 to anonymize the personal information, and acquires, from the server 100, an anonymized file 1b, which the server 100 has anonymized from a non-anonymized file 1a. The non-anonymized file 1a includes items, which are other than an individual name and subject to be used. The embodiment will be described in which an entity of the non-anonymized file 1a is retained inside the client terminal 3. The embodiment is not limited to this configuration. Alternatively, the entity of the non-anonymized file 1a may be externally maintained.

In the anonymization system 1000, an exchange between the client terminal 3 and the server 100 will be briefly described in a case of anonymizing the personal information. The client terminal 3 connects to the server 100 via the network 2. After that, the client terminal 3 has the server 100 conduct the anonymization process corresponding to a desired anonymization degree (k value) via the network 2. In the following, procedures will be described.

<Procedure 1>

The client terminal 3 sends an anonymization condition setting request 8a including an anonymization condition (including the k value), which is indicated by a user and corresponds to the non-anonymized file 1a, to the server 100. The server 100 sets the anonymization condition in response to the anonymization condition setting request 8a of the client terminal 3.

<Procedure 2>

In response to an operation of the user indicating the non-anonymized file 1a to anonymize the non-anonymized file 1a, the client terminal 3 sends an anonymization execution request 8b to the server 100. The server 100 performs the anonymization process by the k value indicated by the anonymization condition, which the client terminal 3 sets with respect to the non-anonymized-file 1a, in response to the anonymization execution request 8b.

<Procedure 3>

The client terminal 3 sends an anonymization evaluation request 8c to the server 100. In response to the anonymization evaluation request 8c, the server 100 evaluates an anonymization state based on a result from performing the anonymization process, that is, by using the anonymized file 1b. In the embodiment, the server 100 provides evaluation information 1c with respect to the anonymized file 1b.

By providing the evaluation information 1c, the following one or more graphs are displayed at the client terminal 3:
  a circle graph representing a ratio for each of k values
  a bar graph representing a ratio for each of combinations of anonymization items.

<Procedure 4>

The client terminal 3 sends an ambiguity request 8d of the anonymization result to the server 100 in response to an operation for making the anonymized file 1b ambiguous after the evaluation information 1c is displayed. The ambiguity request 8d includes an expected k value 1d.

The server 100 makes the anonymized file 1b ambiguous in accordance with the expected k value 1d indicated by the ambiguity request 8d. An ambiguity process for making the anonymized file 1b ambiguous is regarded as a process, which copies or sanitizes the personal information of the anonymized file 1b acquired as a result of the anonymization process as if the expected k value 1d indicated by the ambiguity request 8d is satisfied.

<Procedure 5>

The client terminal 3 sends a condition review request 8e to the server 100 in response to an operation for reviewing the anonymization process by the user. When receiving the condition review request 8e, the server 100 calculates a recommended k value 1e based on the evaluation information 1c and sends the recommended k value 1e to the client terminal 3.

<Procedure 6:>

When receiving the recommended k value 1e, the client terminal 3 sends the anonymization condition setting request 8a indicating the recommended k value 1e to the server 100, and repeats the above described procedures 1 to 5.

As described above, in the embodiment, the server 100 provides the evaluation information 1c indicating to what degree the anonymized file 1b realizes anonymity. Based on the evaluation information 1c, the anonymity of the anonymized file 1b and/or a review of the anonymization process is performed.

The k value indicates a state in which k individuals are not specified respectively by k sets of the personal information (corresponding to k records) in the anonymized file 1b. The k value corresponds to a number of the individuals who are not specified in each of groups (a number of records in which the individuals are not specified) for each of combinations of the anonymization items. On the other hand, when the sets of the personal information (the records) are less than sets (the k records), the individuals may be specified. The anonymization item is regarded as an item of which a value is anonymized in the non-anonymized file 1a.

The anonymization of k=2 is to anonymize data file impossible to specify more than one individual from more than one set of the personal information. Only information common among all sets of the personal information for the more than one individual is retained, and information, which is not common, is sanitized. In this case, there is a group, to which only one individual belongs, in the anonymized file 1b.

The anonymization of k=3 to anonymize data indicates to anonymize the data file impossible to specify more than two individuals from more than two sets of the personal information. Only information common among all sets of the personal information for the more than two individuals is retained, and information, which is not common, is sanitized. In this case, there is at least one of a group to which two individuals belong and in which each of the two individuals is not specified, and a group to which only one individual belongs. The k value may indicate a common degree among multiple sets of the personal information.

In the embodiment, with respect to the anonymized file 1b acquired by anonymizing the personal information, the records are classified into the groups by common portions in the multiple sets of the personal information, and a ratio of the number of the records in each of the groups is acquired with respect to a total number of the records of the anonymized file 1b. Then, the graph is displayed to indicate the ratio for each of the k values and/or the ratio for each of the common portions. Hence, it is possible to easily conduct an anonymization result.

Figure 2:
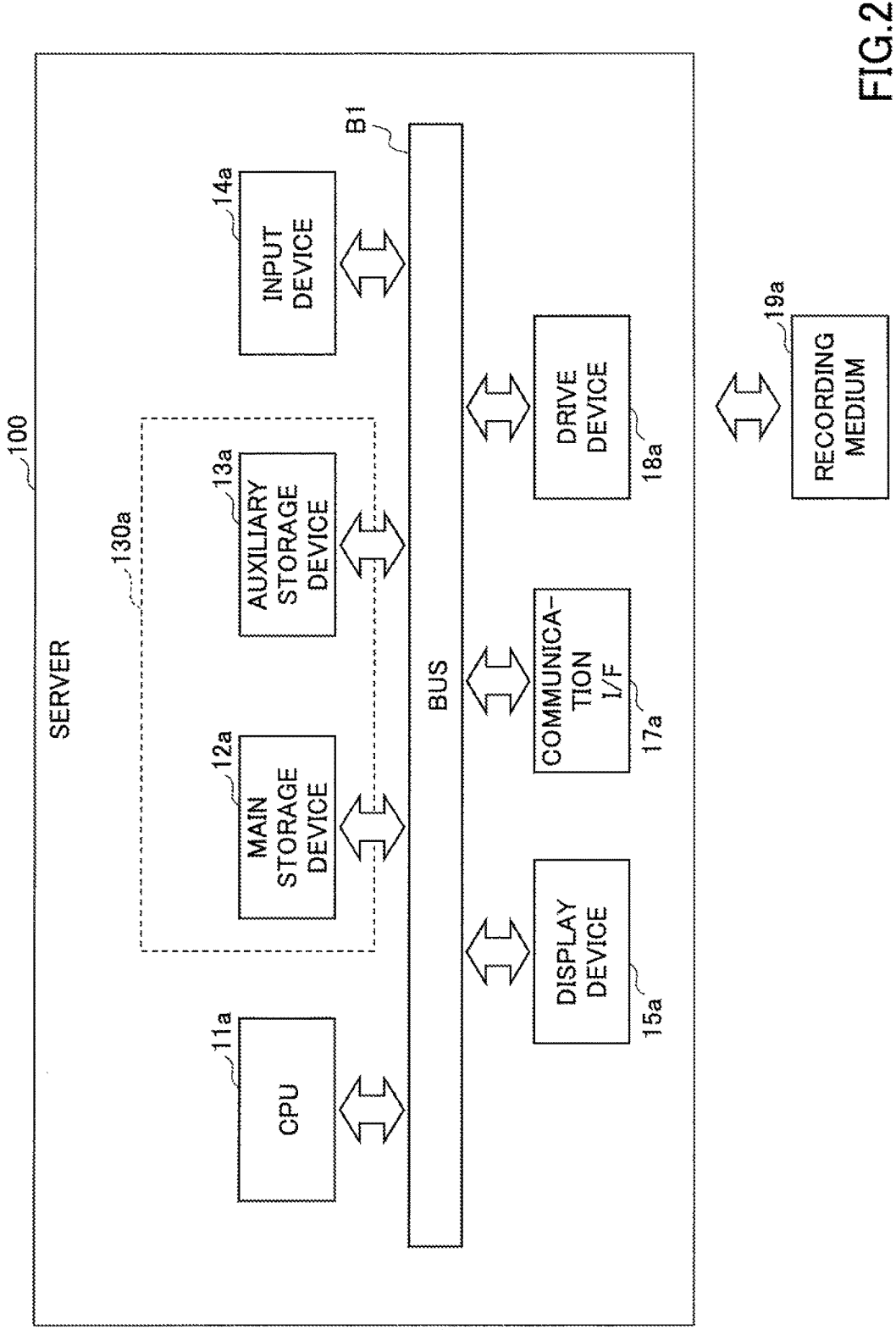
FIG. 2 is a diagram illustrating a hardware configuration of a server.

The server 100 conducting the anonymization process includes a hardware configuration as illustrated in FIG. 2. FIG. 2 is a diagram illustrating the hardware configuration of the server. In FIG. 2, the server 100 is regarded as an information processing apparatus controlled by a computer, and includes a Central Processing Unit (CPU) 11a, a main storage device 12a, an auxiliary storage device 13a, an input device 14a, a display device 15a, a communication Inter-Face (I/F) 17a, and a drive device 18a, which are mutually connected via a bus B1.

The CPU 11a corresponds to a processor that controls the server 100 in accordance with a program stored in the main storage device 12a. The main storage device 12a includes a Random Access Memory (RAM), a Read Only Memory (ROM), and the like, and stores or temporarily stores the program to be executed by the CPU 11a, data used in a process of the CPU 11a, data acquired in the process of the CPU 11a, and the like.

A Hard Disk Drive (HDD) or the like is used as the auxiliary storage device 13a, and stores data such as programs for various processes, and the like. A part of the program stored in the auxiliary storage device 13a is loaded to the auxiliary storage device 13a, and is executed by the CPU 11a to realize the various processes. A storage part 130a corresponds to the main storage device 12a and/or the auxiliary storage device 13a.

The input device 14a includes a mouse, a keyboard, and the like, and is used by a server administrator to input various information items for the processes conducted by the server 100. The display device 15a displays multiple information items under control of the CPU 11. The input device 14a and the display device 15a may be formed as an integrated user interface such as a touch panel or the like. The communication I/F 17a controls communications such as wired or wireless communications through a network. The communication I/F 17a is not limited to the wired or wireless communications.

The program realizing a process conducted by the server 100 in the embodiment may be provided to the server 100 with a recording medium 19a such as a Compact Disc Read-Only Memory (CD-ROM).

The drive device 18a interfaces between the recording medium 19a (which may be the CD-ROM or the like) set to the drive device 18a and the server 100.

Also, respective programs realizing various processes according to the embodiment described below are stored in the recording medium 19a. The programs stored in the recording medium 19a are installed to the server 100 through the drive device 18a. After being installed, the programs become executable in the server 100.

The recording medium 19a storing the programs is not limited to the CD-ROM, and may be a computer-readable, non-transitory, and tangible medium. As the computer-readable recording medium, the recording medium 19a may foe a Digital Versatile Disk (DVD), a Universal Serial Bus (USB) memory, and a semiconductor memory such as a flash memory may be used as well as the CD-ROM.

Figure 3:
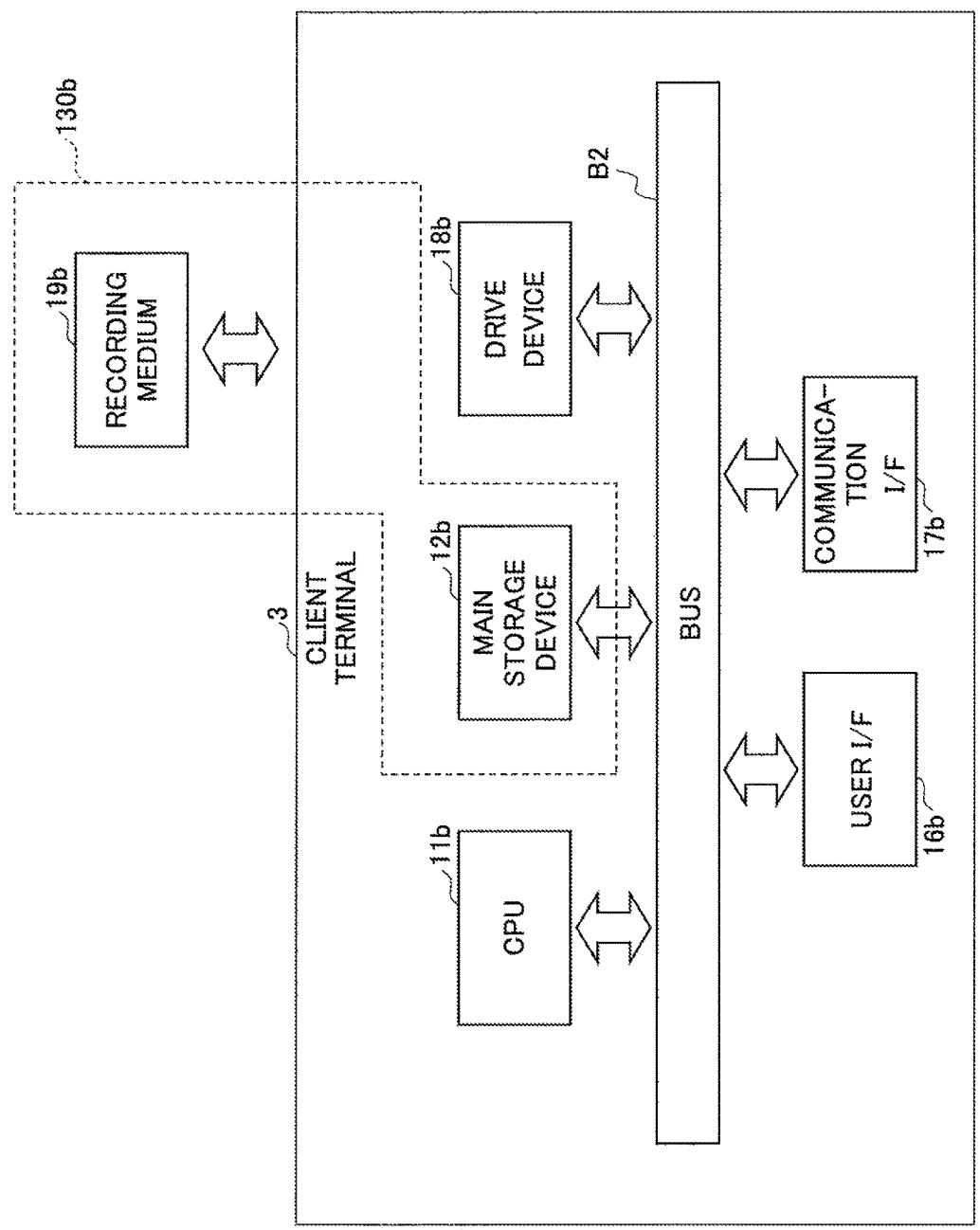
FIG. 3 is a diagram illustrating a hardware configuration of a client terminal.

FIG. 3 is a diagram illustrating a hardware configuration of the client terminal. In FIG. 3, the client, terminal 3 may be an information processing terminal controlled by the computer such as a tablet terminal, a mobile terminal, or the like, and includes a Central Processing Unit (CPU) 11b, a main storage device 12b, a user I/F 16b, a communication I/F 17b, and a drive device 18b, which are mutually connected via a bus B2.

The CPU 11b corresponds to a processor controlling the client terminal 3 in accordance with a program stored in the main storage device 12b. The RAM, the ROM, and the like may be used as the main storage device 12b, and store or temporarily store the program to be executed by the CPU 11b, data used in a process of the CPU 11b, data acquired in the process of the CPU 11b, and the like. The program stored in the main storage device 12b causes the CPU 11b to perform various processes.

The user I/F 16b displays various information items under control of the CPU 11b. The user I/F 16b may be a touch panel or the like enabling the user to conduct input operations and the like. The communication I/F 17b is not limited to the wireless or wired communications.

The program realizing the process conducted by the client terminal 3 may be downloaded from an external apparatus through the network 2. Alternatively, the program may be stored beforehand in the main storage device 12b or a recording medium 19b of the client terminal 3. A storage part 130b corresponds to the main storage device 12b and/or the auxiliary storage device 13b.

The drive device 18b interfaces a recording medium 19b (which may be a Secure Digital (SD) memory card or the like) set to the drive device 18b and the client terminal 3. The recording medium 19b may be a computer-readable, non-transitory, and tangible medium.

The client terminal 3 may be a desktop terminal, a notebook terminal, a laptop terminal, a mobile terminal, or the like.

Figure 4:
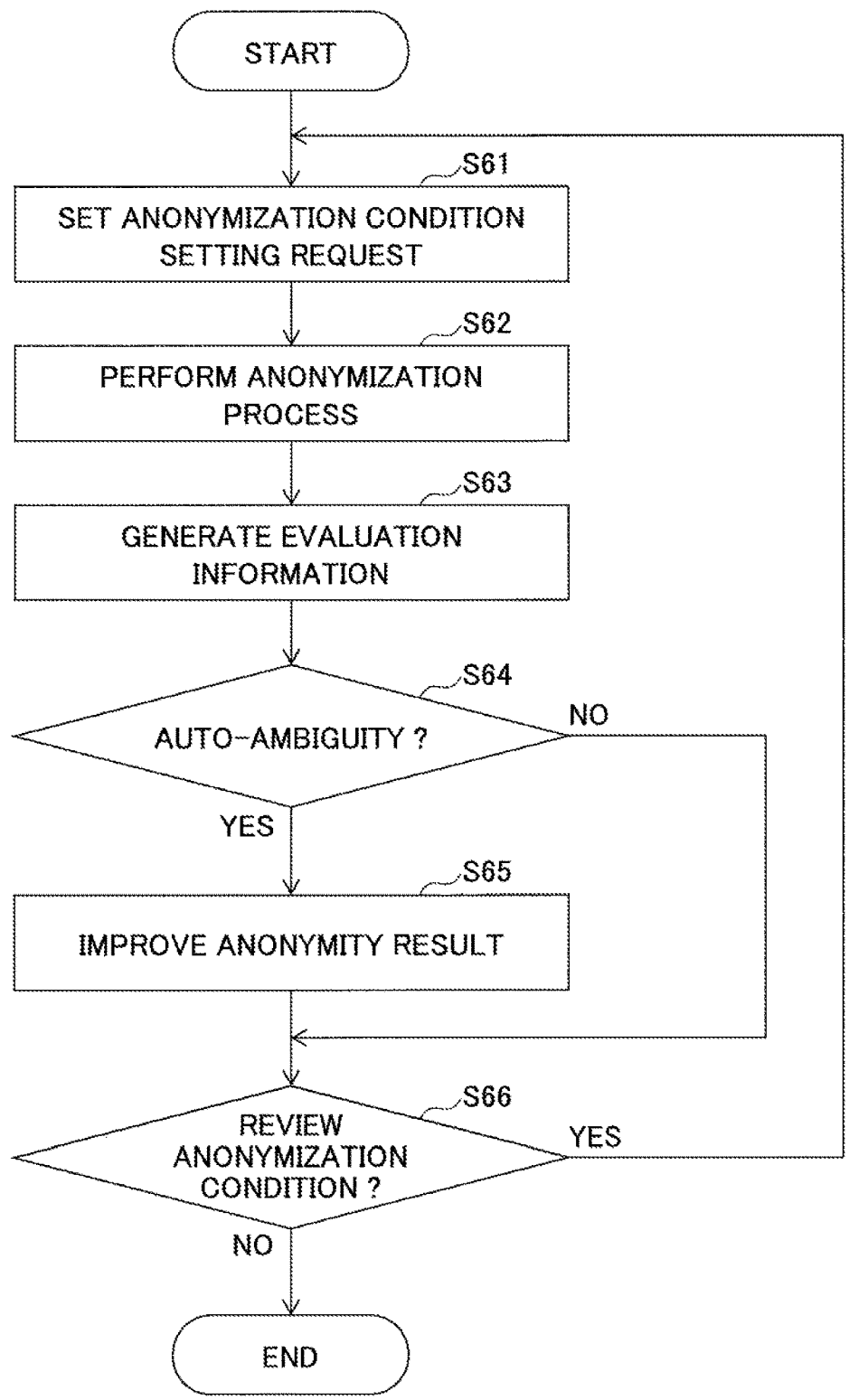
FIG. 4 is a flowchart for briefly explaining an entire process in the anonymization system.

FIG. 4 is a flowchart for briefly explaining an entire process in the anonymization system. Referring to FIG. 4, in the anonymization system 1000, when receiving a setting of the anonymization condition from the user, the client terminal 3 sends the anonymization condition setting request 8a to the server 100 (step S61). The server 100 stores the anonymization condition indicated by the anonymization condition setting request 8a.

After that, the client terminal 3 sends the anonymization execution request 8b to the server 100 in response to an operation of the user to conduct the anonymization process (step S62). The server 100 conducts the anonymization process with respect to the non-anonymized file 1a indicated by the anonymization execution request 8b.

After that, the server 100 generates the evaluation information 1c by totaling the number of records for each of the k values (k=1, 2, 3, . . . ) of the anonymized file 1b (step S63). The evaluation information 1c being generated is displayed by the circle graph or the bar graph at the user I/F 16b of the client terminal 3.

At the client terminal 3, it is determined in response to the operation of the user whether the user selects auto-ambiguity, after the evaluation information 1c is displayed (step S64). When the auto-ambiguity is selected (YES of step S64), the client terminal 3 sends the ambiguity request 8d to the server 100. The server 100 conducts a process to improve anonymity of the anonymized file 1b in accordance with the expected k value 1d of the user (step S65).

On the other hand, when the auto-ambiguity is not selected (NO of step S64), the client terminal 3 determines whether a condition review is selected (step S66). When the condition review is selected (YES of step SS66), the client terminal 3 sends the condition review request 8e to the server 100. The server 100 sends the recommended k value 1e to the client terminal 3. After that, at the client terminal 3, the processes described above are repeated from step S61 in order of the anonymization process in which the recommended k value 1e is set as the anonymization condition.

On the other hand, when the condition review is not selected (NO of step S66), the entire process is terminated in the anonymization system 1000. That is, the client terminal 3 receives the anonymized file 1b from the server 100. The personal information being anonymized is used under control of the user.

Figure 5:
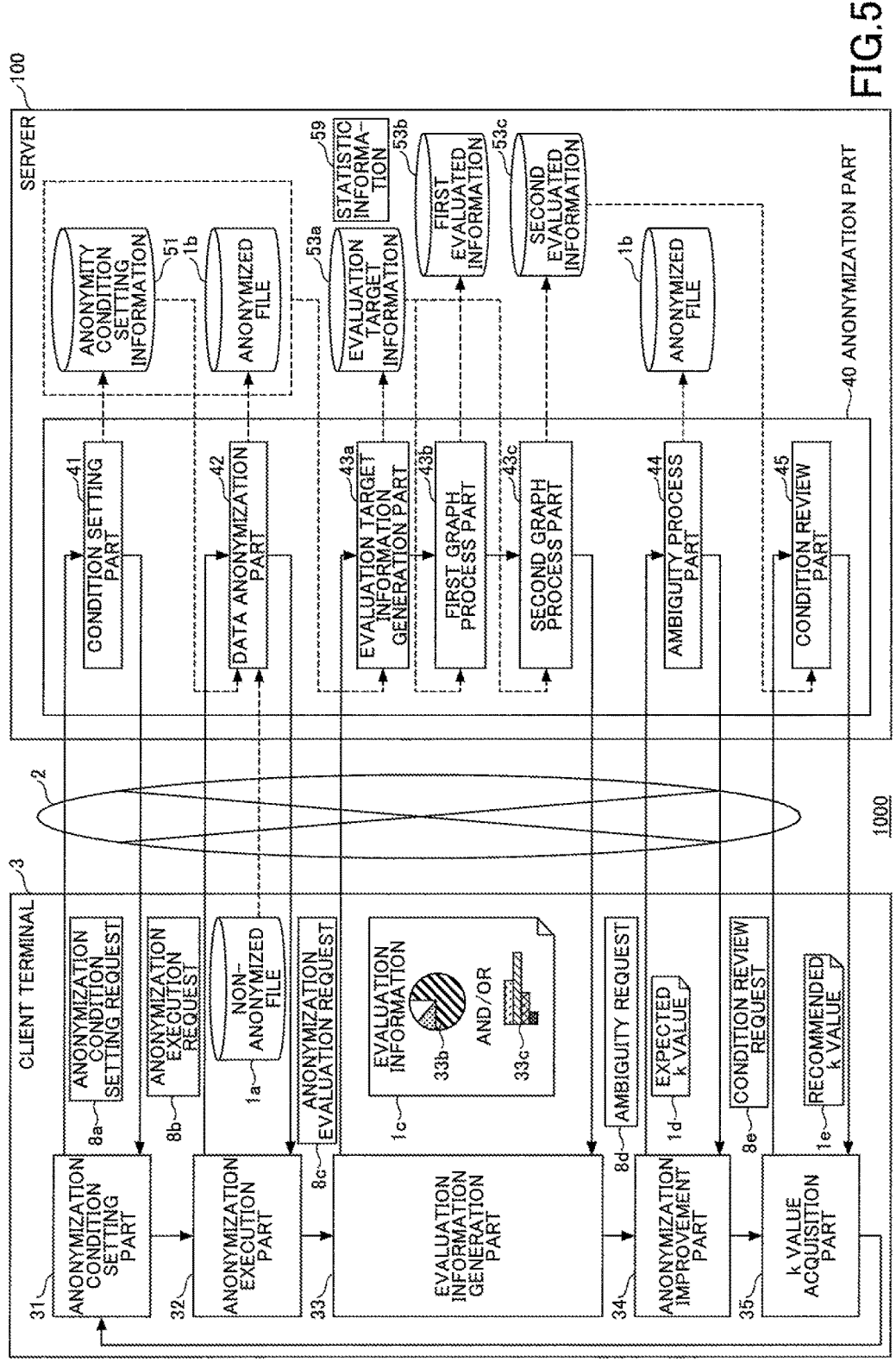
FIG. 5 is a diagram illustrating examples of functional configurations of the client terminal and the server.

Next, examples of functional configurations of the client terminal 3 and the server 100 will be described in the anonymization system 1000. FIG. 5 is a diagram illustrating the examples of functional configurations of the client terminal and the server.

First, a functional configuration of the server 100 will be described. In FIG. 5, the server 100 includes an anonymization part 40 that anonymizes the personal information in the non-anonymized file 1a, which the client terminal 3 indicates, in response to the anonymization execution request 8b.

The anonymization part 40 further includes a condition setting part 41, a data anonymization part 42, an evaluation target information generation part 43a, a first graph process part 43b, a second graph process part 43c, an ambiguity process part 44, and a condition review part 45. The parts 41, 42, 43a, 43b, 43c, 44, and 45 are realized by corresponding processes, which the program installed into the server 100 causes the CPU 11a of the server 100 to perform.

In the server 100, the storage part 130a stores anonymity condition setting information 51, the anonymized file 1b, evaluation target information 53a, first evaluated information 53b, second evaluated information 53c, statistics information 59, and the like.

The condition setting part 41 receives the anonymization condition setting request 8a sent from the client terminal 3 through the communication I/F 17a, and conducts a condition setting process to set the anonymity condition setting information 51 indicating the anonymization condition indicated in the anonymization condition setting request 8a. The anonymization condition includes the k value, more than one combination of the anonymization items, and the like. After storing the anonymity condition setting information 51, the condition setting part 41 sends a setting completion notice to the client terminal 3.

The data anonymization part 42 receives the anonymization execution request 8b sent from the client terminal 3 through the communication I/F 17a, and performs the anonymization process in accordance with the anonymity condition setting information 51 stored in the storage part 130a with respect to the non-anonymized file 1a indicated in the anonymization execution request 8b. After performing the anonymization process, the data anonymization part 42 sends an execution completion notice to the client terminal 3 through the communication I/F 17a.

The anonymization process may be called "k-anonymization process", which anonymizes each set of the personal information in the non-anonymized file 1a not to specify the individuals being less than or equal to k different persons from the personal information in accordance with the anonymization condition defined, beforehand.

The evaluation target information generation part 43a preforms an evaluation target information generation process. In the evaluation target information generation process, the evaluation target information generation part 43a receives the anonymization evaluation request 8c sent from the client terminal 3 through the communication I/F 17a, and generates the evaluation target information 53a by grouping the personal information in the anonymized file 1b for each of the combinations of values of the anonymization items. The evaluation target information 53a is stored in the storage part 130a.

The evaluation target information generation part 43a performs the evaluation target information generation process that classifies the sets of the personal information into the groups for each of the values of the anonymization items, and generates the evaluation target information 53a. The evaluation target information generation part 43a acquires the k value from the number of sets of the personal information (that is, the number of the records) for each of the groups, and acquires the statistics information 59 by calculating the ratio with respect to the total number of the sets of the personal information (that is, the number of the records) of the anonymized file 1b for each of the groups. By the statistics information 59, the k value, the ratio, and the like are indicated for each of the groups.

The first graph process part 43b performs a first graph process. In the first graph process, the first graph process part 43b creates the first evaluated information 53b indicating the ratio for each of the k values by using the statistics information 59a stored in the storage part 130a, and stored the first evaluated information 53b in the storage part 130a. The first graph part 43b creates a circle graph 33b based on the first evaluated information 53b, and sends the evaluation information 1c indicating the created circle graph 33b to the client terminal 3 through the communication I/F 17a.

The first evaluated information 53b may be included in the evaluation information 1c. Alternatively, at the client terminal 3, the circle graph 33b may foe drawn based on the first evaluated information 53b, and may be displayed at the user I/F 16b.

The second graph process part 43c performs a second graph process. In the second graph process, the second graph process part 43c creates the second evaluated information 53c indicating the ratio for each of the k values by using the statistics information 59a stored in the storage part 130a, and stores the second evaluated information 53c in the storage part 130a. The second graph process part 43c creates a bar graph 33c based on the second evaluated information 53c, and sends the evaluation information 1c indicating the created bar graph 33c to the client terminal 3 through the communication I/F 17a.

The evaluation information 1c may include the second evaluated information 53c. Alternatively, at the client terminal 3, the bar graph 33c may be drawn based on the second evaluated information 53c, and may be displayed at the user I/F 16b.

At the client terminal 3, the user may select the circle graph 33b, the bar graph 33c, or both the circle graph 33b and the bar graph 33c as the evaluation target information 53, and a user's selection is indicated in the anonymization evaluation, request 8c.

The ambiguity process part 44 receives the ambiguity request 8d sent from the client terminal 3 through the communication I/F 17a, and performs the ambiguity process. In the anonymization process, the ambiguity process part 44 specifies the records belonging to the groups satisfying less than the expected k value 1d indicated by the ambiguity request 8d from the anonymized file 1b, and makes the personal information in the records ambiguous. By the ambiguity process, there is no personal information being less than the expected k value 1d in the anonymized file 1b.

After the ambiguity process, the ambiguity process part 44 calculates the k value and the ratio for each of the groups, again, updates the statistics information 59, and sends an ambiguity completion notice to the client terminal 3 through the communication I/F 17a. The updated statistics information 59 may be sent to the client terminal 3. Alternatively, the client terminal 3 may send an update request of the evaluation information 1c to the server 100. In this case, the server 100 provides the circle graph 33b and/or the bar graph 33c to the client terminal 3, and the client-terminal 3 displays the updated circle graph 33b and/or the bar graph 33c at the user I/F 16b.

The condition review part 45 performs a condition review process. In the condition review process, the condition review part 45 receives the condition review request 8e sent from the client terminal 3 through the communication I/F 17a. The condition review part 45 acquires the k value of a highest ratio as the recommended k value 1e based on the second evaluated information 53c stored in the storage part 130a with respect to the anonymized file 1b. Then, the condition review part 45 sends the recommended k value 1e to the client, terminal 3 through the communication I/F 17a.

Next, the example of the functional configuration of the client terminal 3 will be described. In FIG. 5, the client terminal 3 includes an anonymization condition setting part 31, an anonymization execution part 32, an evaluation information generation part 33, an anonymization improvement, part 34, and a k value acquisition part 35. The parts 31 to 35 are realized by a process, which the program installed to the client terminal 3 causes the CPU 11b of the client terminal 3 to perform. Alternatively, the parts 31 to 35 may be realized by script codes, which are provided from the server 100, are controlled by the server 100, and operate on a Web browser.

At the client terminal 3, the storage part 130b may temporarily store the non-anonymized file 1a, the evaluation information 1c, the expected k value, the expected k value, and the like.

The anonymization condition setting part 31 performs an anonymization condition setting process. In the anonymization condition setting process, the anonymization condition setting part 31 acquires the k value representing the anonymization degree, one or more items to be anonymized (the anonymization items), or the like from the user, sends the anonymization condition setting request 8a to the server 100 through the communication I/F 17b, and makes the server 100 set the anonymization condition.

The anonymization condition setting part 31 may display a setting screen for setting the k value, the anonymization items, and the like at the user I/F 16b, and may acquire these values from the user. When receiving the setting completion notice sent from the server 100 through the communication I/F 17b, the anonymization condition setting part 31 terminates the anonymization condition selling process.

The anonymization execution part 32 performs an anonymization execution process. In the anonymization execution process, the anonymization execution part 32 sends the anonymization execution request 8b to the server 100 through the communication I/F 17b in response to an operation of executing the anonymization process with the anonymization condition set by the user. The server 100 anonymizes the personal information.

The anonymization execution part 32 may display an anonymization execution screen at the user I/F 16b and may acquire a storage location of a file from the user. The anonymization execution screen may include an area to indicate the file to be anonymized, a button to execute the anonymization of the file. The anonymization execution request 8b may include the entity of the non-anonymized file 1a, and may indicate the storage location. The anonymization execution part 32 may receive the execution completion notice sent from the server 100 through the communication I/F 17b, and terminates the anonymization execution process.

The evaluation information generation part 33 sends the anonymization evaluation request 8c to the server 100 through the communication I/F 17b, in response to an operation of the user pertinent to generation of the evaluation information or an end of the anonymization execution process. The server 100 evaluates the anonymity with respect to the anonymized file 1b. After that, the client terminal 3 receives the evaluation information 1c from the server 100, and performs an evaluation information generation process for displaying the evaluation information 1c at the user I/F 16b.

The evaluation information generation part 33 displays the circle graph 33b and/or the bar graph 33c at the user I/F 16b based on the evaluation information 1c received from the server 100, and terminates the evaluation information generation process. At a screen displaying the circle graph 33b and/or the bar graph 33c at the user I/F 16b, it is preferable to display an "auto-ambiguity" button to improve the ambiguity, a "condition review" button to review the anonymization condition, and the like.

The anonymization improvement part 34 performs an anonymization improvement process. In the anonymization improvement process, the anonymization improvement part 34 sends the ambiguity request 8d to the server 100 through the communication I/F 17b in response to an operation of the user indicating the "auto-anonymization". The server 100 makes the personal information in the anonymized file 1b ambiguous in accordance with the expected k value 1d indicated by the ambiguity request 8d. When receiving the ambiguity completion notice sent from the server 100 through the communication I/F 17b, the anonymization improvement part 34 terminates the anonymization improvement process.

The k value acquisition part 35 performs a k value acquisition process. In the k value acquisition process, the k value acquisition part 35 sends the condition review request 8e to the server 100 through the communication I/F 17b in response to an operation of the user indicating the "condition review". The server 100 reviews the anonymization condition with respect to the non-anonymized file 1a. As a result, the client terminal 3 receives the recommended k value 1e from the server 100.

Next, the anonymization process of the personal information by the anonymization part 40 of the server 100 in the embodiment will be described with reference to a data example. First, the anonymization process by the anonymization part 40 of the server 100 will be described.

FIG. 6 is a diagram illustrating the anonymization process. In FIG. 6, a file including the personal information pertinent to an injury and disease history is illustrated as an example of the non-anonymized file 1a. A difference will be described between a case of the anonymization process other than the k-anonymization process and a case of the k-anonymization process. As an example of the anonymization process other than the k-anonymization process, a masking anonymization process will be described.

The non-anonymized file 1a includes items such as "NAME", "ADDRESS", "GENDER", "AGE", "DIAGNOSTIC RESULT", and the like. By the anonymization process, the item "NAME" is sanitized from the non-anonymized file 1a, the anonymization items are set from the items "ADDRESS", "GENDER", "AGE", "DIAGNOSTIC RESULT", and the like.

In this example, the items "ADDRESS", "GENDER", and "AGE" are set as the anonymization items. In the non-anonymized file 1a depicted in FIG. 6, there is only one record for a combination of the address "HEIWAJIMA 2, OTA-KU, TOKYO", the gender "M" (male), and the age "75". Thus, an individual "AAA BBB" is highly likely to be specified without the name.

In the masking anonymization process, for one or more items, the personal information is anonymized by rounding item values to reduce precision, by masking the item values by deleting the item values and replacing the item values, with predetermined values, and the like.

For a masked file 1m, a data example is depicted in a case in which the non-anonymized file 1a is masked to be anonymized.

In this data example, a region is rounded into prefectural governments with respect, to the address. Since the precision of the address is reduced, it becomes difficult to specify the individuals. However, the precision is lower, if the masked file 1m is used for a trend analysis based on a region. Also, in a case of masking the personal information for the age, it becomes difficult to specify the individuals. On the other hand, it is impossible to conduct an analysis based on the age. Accordingly, effective data are not provided by the masked file 1m in light of utilization.

The k-anonymization process will be briefly described in a case of k=2. That is, the anonymized file 1b is acquired when the non-anonymized file 1a is anonymized while allowing two or more records having the same values of the anonymization items.

The anonymized file 1b indicates a result from making values of the address and the age ambiguous. In the anonymized file 1b, precision of the item values are made to be rough until the number of the records having the same item values is not reduced less than or equal to two. However, the precision may not be made to be uniformly rough for all records.

In the anonymized file 1b, there are two records of the address "Ota-ku, Tokyo", and there are two records of the address "Tokyo". Accordingly, with respect to a part of the records, it is possible to acquire the personal information related to the region specified in detail more than the prefectural governments. Hence, it is possible to conduct regional analysis.

Regarding the age, there are at least two records for each of the age "60s to 70s" and the age "10s to 20s". It is possible to analyze each of the age "60s to 70s" and the age "10s to 20s".

FIG. 7 is a diagram for explaining the evaluation target information generation process. In FIG. 7, the evaluation target information generation part 43a of the server 100 generates the evaluation target information 53a by applying a group ID for each of the combinations of three items of the anonymized file 1b: the address, the gender, and the age. The evaluation target information 53a corresponds to a file to which the group ID is added to existing items of the anonymized file 1b. That is, the evaluation target information 53a includes the items of the address, the gender, the age, the diagnostic result, the group ID, and the like.

In this example, the records indicating the address "Ota-ku, Tokyo", the gender "M", and the age "60s to 70s" are classified into a group "G001". The records indicating the address "Tokyo", the gender and the age "10s to 20s" are classified into a group "G002". The records indicating the address "Nakahara-ku, Kawasaki-shi, Kanagawa-ken, Tokyo", the gender "M", and the age "60s to 70s" are classified into a group "G003".

Two records are classified into the group "G001", three records are classified into the group "G002", and one record is classified into the group "G003".

The evaluation target information generation part 43a refers to the evaluation target information 53a, and acquires the k value by counting the records having the same group ID for each of the groups. Accordingly, the k value indicates the count of the records having the same values for the anonymization items, in this example, the same values for the combination of the address, the gender, and the age.

The evaluation target information generation part 43a calculates the ratio with respect to the total number of the records of the evaluation target information 53a for each of the group IDs, and generates the statistics information 59. The statistics information 59 includes the items of the group ID, the k value, the ratio, and the like.

In this example, the statistics information 59 indicates the k value "2" and the ratio "33%" for the group ID "G001", the k value "3" and the ratio "50%" for the group ID "G002", and the k value "1" and the ratio "17%" for the group ID "G003". For each of the groups, a different k value is indicated. However, there may be two or more groups indicating the same k value.

FIG. 8 is a diagram illustrating an example of an evaluation result screen displayed at the client terminal. In FIG. 8, a display example at the user I/F 16b of the client terminal 3 is depicted. The display example depicts the circle graph 33b generated by the first graph process part 43b of the anonymization part 40 of the server 100 based on the statistics information 59.

At the client terminal 3, an evaluation result screen G91 is displayed at the user I/F 16b based on the evaluation information 1c received from the server 100 by the evaluation information generation part 33. The evaluation result screen G91 includes a first display area 91a, a second display area 91b, and the like.

The first display area 91a corresponds to an area for displaying various information items according to the anonymization process. The second display area 91b corresponds to an area for displaying the evaluation result acquired by evaluating the anonymization state of the anonymized file 1b.

The first display area 91a displays basic information pertinent to anonymization requested from the client terminal 3 to the server 100. The first display area 91a may display information of a request ID, a request date, a completed date, a pre-processed code count, a post-processed code count, an anonymized file, the k value, the anonymized items, and the like. At an item "ANONYMIZED FILE", the anonymized file 1b, which is acquired by anonymizing the non-anonymized file 1a and is stored in the storage part 130a of the server 100, is displayed for user to download from the client terminal 3 to the server 100. Also, the anonymization condition used for the anonymization is indicated at items "K VALUE" and "ANONYMIZED ITEMS".

The second display area 91b displays the evaluation result of the anonymization state. The second display area 91b may display a total number of the groups 91c (a number of combinations of anonymization item values) of the anonymized file 1b, the circle graph 33b (or the bar graph 33c), a "GRAPH SWITCH" button 91e, an "AUTO-AMBIGUITY" button 91f, a "REVIEW CONDITION" button 91g, and the like.

As an example, the circle graph 33b may indicate a ratio of the number of the records having the k value greater than the anonymization condition set by the user, a ratio of the number of the records having the k value of the anonymization condition, and a ratio of the number of the records having the k value smaller than the anonymization condition. If the anonymization process is conducted with the anonymization condition "k=3", the ratio of k>3, the ratio of k=3, and the ratio of k<3 are indicated. The records of k=3 and k>3 satisfy the anonymization condition.

When the user selects an area of the ratio of k<3 on the circle graph 33b displayed as described above, a screen G92 is displayed to indicate the records of interest. As an example of the screen G92, contents of one record of k=1 is displayed for the records of k<3. The contents of this record may indicate the address "Nakahara-ku, Kawasaki-shi, Kanagawa-ken", the gender "M", the age "60s to 70s", the diagnostic result "influenza", and the group ID "G003". It is possible for the user to concretely review the contents of each of the records, which do not satisfy the anonymization condition.

In this example, when the user selects the "GRAPH SWITCH" button 91e, the circle graph 33b is changed to the bar graph 33c. In a state of displaying the bar graph 33c, if the graph switch button 91e is selected, the circle graph 33d is displayed.

In a case of making the contents of the records ambiguous after the user confirms the contents of the records, which do not satisfy the anonymization condition in the screen G92, the user selects the "AUTO-AMBIGUITY" button 91f. When the "AUTO-AMBIGUITY" button 91f is selected, the user may set a desired k value (the expected k value). Also, the expected k value may not be set. In this case, the k value (=3) of the anonymization condition is set as a default value. In response to selection of the "AUTO-AMBIGUITY" button 91f, the ambiguity request 8d is sent to the server 100.

In the server 100, after the ambiguity process by the ambiguity process part 44, the ambiguity process part 44 has the evaluation target information generation part 43a, the first graph process part 43b, and the second graph process part 43c conduct corresponding processes, and sends the evaluation information 1c as an ambiguity result to the client terminal 3. In this manner, it is possible to update information in the second display area 91b of the evaluation result screen G91 being displayed at the user I/F 16b at the client terminal 3.

The user refers to the circle graph 33b (or the bar graph 33c) being updated in the second display area 91b. When the user decides to review the anonymization condition, the user selects the "REVIEW CONDITION" button 91g. In response to the "REVIEW CONDITION" button 91g, the condition review request 8e is sent to the server 100.

At the server 100, the anonymization condition is reviewed by the condition review part 45, and the recommended k value 1e acquired by the review is provided to the client terminal 3. At the client terminal 3, when receiving the recommended k value 1e, the anonymization condition setting process is conducted by the anonymization condition setting part 31, again. In the anonymization condition setting process, the recommended k value 1e is indicated as the anonymization condition in the anonymization condition setting request 8a, and is sent to the server 100.

FIG. 9 is a diagram for explaining the second graph process. In FIG. 9, the second graph process part 43c of the anonymization part 40 of the server 100 refers to the evaluation target information 53a, the statistic information 59 stored in the storage part 130a, generates the second evaluated information 53c, and stores the generated second evaluated information 53c in the storage part 130a.

In addition to the existing items of the statistic information 59, the anonymization items (the address, the gender, and the age) are added to the second evaluated information 53c.

The second graph process part 43c acquires the records having the same group IDs of respective records of the statistics information 59, from the evaluation target information 53a, sets values of the address, the gender and the age of each of the acquired records to the second evaluated information 53b, and completes the second evaluated information 53c. After that, the second graph process part 43c sorts the second evaluated information 53c in a predetermined order. The second evaluated information 53c may be sorted in an ascending order of the ratio, the anonymization items, the k value, or the like. The bar graph 33c is drawn based on the ratio.

FIG. 10 is a diagram illustrating an example of the bar graph. In the bar graph 33c depicted in FIG. 10, for the item "RATIO" of the second evaluated information 53c, bars representing respective numerical values are displayed with these numerical values. A display of the bar graph 33c is not limited to this example depicted in FIG. 10.

In the evaluation result screen G91 displayed at the client terminal 3 as depicted in FIG. 8, the bar graph 33c is displayed in the second display area 91b.

When the user selects the "AUTO-AMBIGUITY" button 91f in the second display area 91b, the ambiguity request 8d is sent from the client terminal 3 to the server 100. The ambiguity process, which is conducted by the ambiguity process part 44 of the anonymization part 40 at the server 100, will be described with reference to FIG. 11 and FIG. 12.

Figure 11:
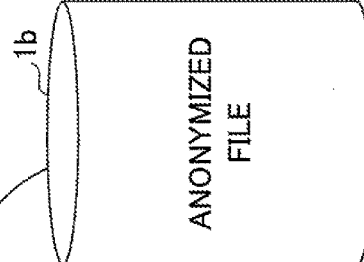
FIG. 11 is a diagram for explaining an ambiguity process.

FIG. 11 is a diagram for explaining the ambiguity process. In FIG. 11, the ambiguity process part 44 refers to the statistics information 59 being stored in the storage part 130a based on the expected k value 1d indicated by the ambiguity request 8d, and acquires one or more group IDs. In the following, a case of indicating k=2 by the expected k value 1d will be described. In this example, the acquired group ID is "G003".

The ambiguity process part 44 searches for the records of the group ID "G003" from the anonymized file 1b, copies all retrieved records, and generates the evaluation target information 53a-2. Each of the retrieved records is repeatedly copied at least until a repetition count reaches the expected k value 1d. If there is the k value greater than the expected k value 1d, each of the retrieved records may be repeatedly copied until the repetition count reaches a highest k value.

As a result, the evaluation target information 53a-2, in which a record 9r of the group ID "G003" is copied, is acquired. In FIG. 11, a copying example is depicted. Instead, the retrieved records may be deleted to make the evaluation target information 53a-2 ambiguous. Also, the user may set copy or deletion when the user selects the "AUTO-AMBIGUITY" button 91f.

Figure 12:
FIG. 12 is a diagram illustrating an update example of statistics information by the ambiguity process.

FIG. 12 is a diagram illustrating an update example of the statistics information by the ambiguity process. In FIG. 12, the ambiguity process part 44 updates the statistics information 59 by using the evaluation target information 53a acquired by the ambiguity process, and obtains the statistics information 59-2.

In the statistics information 59-2, the k value of the group ID "G003" is changed from "1" to "2", and the k value is two or more for ail groups. Accordingly, the anonymized file 1b satisfying the expected k value is provided.

The ratio of the group ID "G001", that is, the ratio of the records (the personal information), which, are specified by "G001", respective to the combinations of values of the anonymization items is changed from "33%" to "29%". The ratio of the group ID "G002", that is, the ratio of the records (the personal information), which are specified by "G002", respective to the combinations of values of the anonymization items is changed from "50%" to "43%". The ratio of the group ID "G003", that is, the ratio of the records (the personal information), which are specified by "G003", respective to the combinations of values of the anonymization items is changed from "17%" to "29%".

The ambiguity process part 44 instructs at least one of the first graph process part 43*b* and the second graph process part 43*c* to generate the first evaluated information 53*b* and the second evaluated information 53*c* by using the evaluation target information 53*a*-2 and the statistics information 59-2. Then, the evaluation information 1*c* after the ambiguity process is provided to the client terminal 3.

Referring back to FIG. 10, by using the data example of the bar graph 33*c*, an example of the condition review process by the condition review part 45 will be described. The condition review part 45 determines the k value of the highest ratio as the recommended k value 1*e* based on the second evaluated information 53*c* (the bar graph 33*c*). In this case, the recommended k value 1*e* is "3".

When there are multiple k values of the highest ratio, the k value of a smallest ratio is set as the recommended k value 1*e* among the multiple k values. In general, the smaller the ratio of the k value is, the more the personal information is acceptable to be used. Hence, the k value of the smallest ratio is applied.

As described above, in the embodiment, it is possible for the user of the client terminal 3 to easily evaluate the anonymization state of the anonymized file 1*b*. By referring to the circle graph 33 indicating the ratios of respective k values and/or the bar graph 33*c* indicating the ratio for each of combinations of the values of the anonymization items, it is possible for the user to easily evaluate the anonymization based on objective numeral values. Accordingly, it is possible to reduce time spent to evaluate the anonymized file 1*b*.

Also, it is possible for the user to make all records of the anonymized file 1*b* ambiguous by indicating the expected k value 1*d* until the expected k value 1*d* is satisfied.

Moreover, in a case of reviewing the anonymization condition, it is possible for the user to perform the anonymization process with the recommended k value 1*e*, and to refer to an evaluation of the recommended k value 1*e*.

As described above, in the embodiment, it is possible for the server 100 to easily evaluate the anonymized file 1*b* for the user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A personal information anonymization method performed by a computer, comprising:
    classifying each of a plurality of records including personal information into any one of a plurality of groups based on a degree of commonality of the personal information;
    performing, for each of the groups, an anonymization process that standardizes the personal information of each of records;
    calculating a total number of the records for each of the groups;
    calculating a ratio of an aggregate number of records in one or more groups having the same total number of records with respect to a number of the entire records, among multiple calculated total numbers of the records; and
    outputting, as a recommended value for an anonymization, a highest ratio among the calculated ratios.

2. The personal information anonymization method as claimed in claim 1, wherein the classification result includes a number of the plurality of the groups having a specific total number of records, and information indicating a ratio of the specific total number with respect to the plurality of the groups.

3. The personal information anonymization method as claimed in claim 1, further comprising:
    adding one or more records including anonymized personal information in another group different from the specific group in the plurality of the groups, with respect to the another group in order to include a same number of records as the number of records in the specific group, which has a largest number of the records among the plurality of the groups.

4. The personal information anonymization method as claimed in claim 1, further comprising:
    specifying groups, to which the records belonging are fewer than a reference number, among the plurality of the groups when receiving an input of the reference number with respect to the records classified into each of the plurality of the groups; and
    copying the records in each of the specified groups until the sets of the records become greater than or equal to the reference number.

5. The personal information anonymization method as claimed in claim 1, further comprising:
    specifying groups, each of which the records are fewer than a reference number, among the plurality of the groups, when receiving an input of the reference number with respect to the records classified into each of the plurality of the groups; and
    deleting the records belonging to the specified groups.

6. The personal information anonymization method as claimed in claim 1, further comprising;
    classifying the groups for every different total number; and
    outputting a classification result indicating the calculated ratio for each of classifications.

7. The personal information anonymization method as claimed in claim 1, wherein the computer repeats a process including:
    outputting the total number of the records belonging to a group having a highest ratio among ratios of total numbers of the records belonging to respective groups with respect to the records of whole groups, when receiving a request of reviewing a common degree among a plurality of the personal information;
    calculating the total number of the records by conducting the anonymization process by setting the total number of the records belonging to the group having the highest ratio to the common degree, the group being output; and
    outputting the classification result from classifying the plurality of the groups based on the total number of the records.

8. The personal information anonymization method as claimed in claim 7, wherein the computer performs, with respect to the personal information of the records, the anonymization process that anonymizes a common portion of the personal information while allowing specifying individuals less than a number based on the common degree.

9. A non-transitory computer-readable recording medium that stores a personal information anonymization program that causes a computer to execute a process comprising:
- classifying each of a plurality of records including personal information into any one of a plurality of groups based on a degree of commonality of the personal information;
- performing, for each of the groups, an anonymization process that standardizes the personal information of each of records;
- calculating a total number of the records for each of the groups;
- calculating a ratio of an aggregate number of records in one or more groups having the same total number of records with respect to a number of the entire records, among multiple calculated total numbers of the records; and
- outputting, as a recommended value for an anonymization, a highest ratio among the calculated ratios.

10. The non-transitory computer-readable recording medium as claimed in claim 9, further comprising;
- classifying the groups for every different total number; and
- outputting a classification result indicating the calculated ratio for each of classifications.

11. An information processing apparatus, comprising:
a processor that executes a process including
- classifying each of a plurality of records including personal information into any one of a plurality of groups based on a degree of commonality of the personal information;
- performing, for each of the groups, an anonymization process that standardizes the personal information of each of records;
- calculating a total number of the records for each of the groups;
- calculating a ratio of an aggregate number of records in one or more groups having the same total number of records with respect to a number of the entire records, among multiple calculated total numbers of the records; and
- outputting, as a recommended value for an anonymization, a highest ratio among the calculated ratios.

12. The information processing apparatus as claimed in claim 11, further comprising;
- classifying the groups for every different total number; and
- outputting a classification result indicating the calculated ratio for each of classifications.

* * * * *